United States Patent [19]

Hagar et al.

[11] B 3,921,152

[45] Nov. 18, 1975

[54] AUTOMATIC DATA RETRIEVAL SYSTEM FOR PUMPING WELLS

[75] Inventors: James L. Hagar, Oklahoma City; Harold E. Schwartz, Jr., Norman, both of Okla.

[73] Assignee: Mobil Oil Corporation, New York City, N.Y.

[22] Filed: July 23, 1973

[21] Appl. No.: 381,847

[44] Published under the Trial Voluntary Protest Program on January 28, 1975 as document no. B 381,847.

Related U.S. Application Data

[62] Division of Ser. No. 258,756, June 1, 1972, Pat. No. 3,824,851.

[52] U.S. Cl. .......... 340/172.5; 235/151.3; 340/150; 166/65

[51] Int. Cl.$^2$.... G06F 3/04; G06F 3/05; H04Q 9/02

[58] Field of Search............ 340/172.5, 150, 163 R; 235/151.3; 166/65

[56] References Cited

UNITED STATES PATENTS

| | | | |
|---|---|---|---|
| 3,350,687 | 10/1967 | Gabrielson | 340/163 |
| 3,541,513 | 11/1970 | Paterson | 340/151 |
| 3,559,177 | 1/1971 | Benson | 340/163 |
| 3,588,832 | 6/1971 | Duncan | 340/172.5 |
| 3,629,855 | 12/1971 | Conley | 340/172.5 |
| 3,629,859 | 12/1971 | Copland | 340/172.5 |
| 3,731,279 | 5/1973 | Halsall | 340/172.5 |
| 3,760,362 | 9/1973 | Copland | 340/172.5 |

*Primary Examiner*—Gareth D. Shaw
*Assistant Examiner*—James D. Thomas
*Attorney, Agent, or Firm*—C. A. Huggett; George W. Hagar, Jr.

[57] ABSTRACT

Measurements of the load conditions on a plurality of pumping wells are made by strain gauges mounted on the pumping wells. A field-located remote terminal unit is connected to each of the plurality of pumping wells. Upon command from a centrally located computer, the remote terminal unit stores the load condition measurements from a pumping well selected by the computer. At some later time the computer retrieves the load condition measurements stored in the remote terminal unit.

7 Claims, 13 Drawing Figures

AUTOMATIC DATA RETRIEVAL SYSTEM FOR PUMPING WELLS

This is a division of application Ser. No. 258,756, filed June 1, 1972, now U.S. Pat. No. 3,824,851.

BACKGROUND OF THE INVENTION

This invention relates to monitoring of sucker-rod-type well pumping units and more particularly to a system for monitoring the operation of such units by operating on a transducer signal representative of load changes in the units.

Sucker-rod-type pumping units are widely used in the petroleum industry to recover fluids from wells extended into subsurface formations. Such units include a sucker rod string extending into the well and means at the surface of the well for reciprocatng the sucker rod string in order to operate a downhole pump. Typical of such units are the so-called "beam-type" pumping units. In a beam-type pumping unit the sucker rod string is suspended at the surface of the well from structure comprising a sampson post and a walking beam pivotally mounted on the sampson post. The sucker rod string normally is connected at one end of the walking beam. The walking beam is also connected to a prime mover through a suitable crank, crank shaft, and pitman connection. By this arrangement, the walking beam and sucker rod string are driven in a reciprocal movement by the prime mover.

In order to monitor the performance of a well produced by means of a rod-type pumping unit, it is a conventional practice to measure, either directly or indirectly, the load on the sucker rod string during each pumping stroke of the pumping operation. One particularly useful system by which this may be accomplished is disclosed in U.S. Pat. application Ser. No. 58,439, filed July 27, 1970, entitled WELL MONITORING PROCESS AND APPARATUS by Richard C. Montgomery and Jacque R. Stoltz. In this system, a transducer secured to the walking beam of a beam pumping unit generates a signal representative of the load in the beam as the beam is reciprocated during each pumping stroke. The load changes in the beam are representative of the load changes in the sucker rod string such that the information derived from the transducer may be utilized to analyze and/or control the performance of the well.

Another conventional technique for obtaining an indication of load measurements in the sucker rod string is to employ a transducer commonly termed a pump dynamometer which is attached directly to the sucker rod string, normally in the polished rod section thereof, to monitor variations in the stress in the sucker rod string. For example, U.S. Pat. No. 3,359,791, issued Dec. 26, 1967, to Rodney A. Pantages, discloses a dynamometer which is mounted on the polished rod and which functions to generate an alarm or to initiate control action such as shut down of the prime mover in response to abnormally high or low loads on the polished rod.

Several methods have been employed to record these load measurements in the walking beam or the sucker rod string. One such method has been to record the load measurements directly onto a chart recording located at the well site. Another method has been to utilize an on-site computer to record the load measurements, with a large portion of the computer time dedicated to monitoring these load measurements. It has also been proposed that the recording of pumping well load measurements be controlled from a central data center. For example, as described by C. C. Boggus in "Let's Weigh Those Wells Automatically," THE OIL AND GAS JOURNAL, Vol. 62, No. 5, Feb. 3, 1964, p. 78, the output from a large number of pump dynamometers can be applied to a central computer where the information will be analyzed and appropriate control action taken.

SUMMARY OF THE INVENTION

This invention provides new apparatus for monitoring the operation of a number of remotely located well pumping units and for subsequently transmitting information as to the load characteristics of the pumping units to a centrally located computer for analyzation and for the control of the well pumping units. In carrying out the invention, there is provided a remote terminal unit which links a plurality of pumping wells to a central computer. The remote terminal unit includes a plurality of relays, one for each of the pumping wells. The central computer, upon appropriate command to the remote terminal unit, may couple a desired pumping well to the remote terminal unit by energizing the appropriate relay. A storage unit, located in the remote terminal unit, will monitor and store load measurements from the pumping well which is coupled to the remote terminal unit at the data rate for which the load measurements are being made, such data rate being dependent upon the stroke time of the pumping well. After load measurements from the particular pumping well have been stored in the storage unit of the remote terminal unit for a complete pumping stroke, the central computer may thereafter initiate a command to retrieve the data stored in the storage unit at a data rate faster than the rate at which the load measurements were transferred from the pumping well to the remote terminal unit. In this manner, the computer, after initiating a command to the remote terminal unit to monitor well pumping data, is free to carry out other data processing activities while the data from the pumping unit is being monitored and stored in the remote terminal unit at a data rate which is slower than the data rate at which the computer is capable of receiving data. The computer can then at a later time retrieve the data in a fast read cycle, thereby permitting more economic utilization of the central computer.

In another aspect, there is provided a transducer for generating a load signal representative of the changing load conditions on the sucker rod string during pumping operations. Timing pulses are generated at periodic intervals during each pumping stroke of the sucker rod string. The load signals are stored in a plurality of storage registers, one register being provided for each of the periodic intervals during the pumping stroke. The timing pulses strobe the load signals into the storage registers for the periodic intervals of the pumping stroke during which the load signals were generated.

In yet another aspect of the invention, the transducer is a strain gauge which generates a variable-current signal representative of the changing load conditions during the pumping stroke. The variable-current signal is utilized to generate a variable-frequency signal which varies linearly with the current signal. The variable-frequency signal is converted to a digital signal for storage in the storage registers.

In a further aspect of the invention, a ring is mounted around the crank shaft, the ring having a plurality of magnets located around its periphery. A pickup assembly is mounted adjacent the crank shaft and produces the timing pulses as each of the magnets passes by the assembly as the crank shaft is rotated.

In still a further aspect of the invention, the stroke time of the pumping well is determined. A counter is provided for accumulating a count of a number of clock pulses which are produced after the start of the pumping stroke. Upon the occurrence of each of selected ones of the timing pulses generated for the periodic intervals of the pumping stroke, the count stored in the counter is shifted into one of a plurality of storage registers. That is, at the end of a first selected number of periodic intervals, the accumulated count is shifted into one of a plurality of storage registers. Likewise, at the end of a second selected number of periodic intervals, the accumulated count is shifted into a second of the plurality of storage registers. This accumulation of count pulses and shifting of the counts into storage registers continues during the entire pumping stroke.

In a yet more specific aspect of the invention, 1-KHz clock pulses are applied to the counter. The accumulated counts are shifted into the storage registers at the 1-KHz clock rate. The stored counts thereby represent the stroke time of the pumping well for each of the selected number of periodic intervals in milliseconds.

In a still further aspect of the invention, each revolution of the crank shaft corresponds to one pumping stroke of the sucker rod string, timing pulses are produced for each 10° of rotation of the crank shaft, and the accumulated count is shifted into the storage registers at intervals of 70°, 140°, 210°, 280°, and 360°.

It is to be understood that the foregoing disclosure relates to only a preferred embodiment of the invention. Various modifications may be contemplated and resorted to by those skilled in the art without departing from the spirit and scope of the invention as hereinafter defined by the appended claims.

DESCRIPTION OF A SPECIFIC EMBODIMENT

Figure 1:
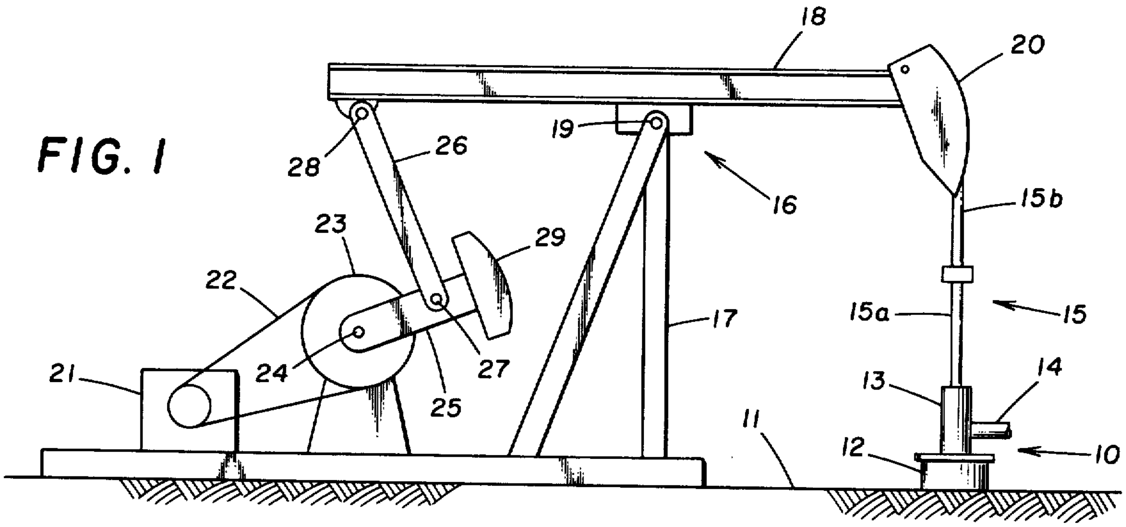
FIG. 1 illustrates a pumping well equipped with a sucker-rod-type pumping unit.

With reference to FIG. 1, there is illustrated the wellhead 10 of a well which extends from the earth's surface 11 into a subsurface oil producing formation (not shown). The wellhead comprises the upper portions of a casing string 12 and a tubing string 13. Liquid from the well is produced through the tubing string 13 by means of a downhole pump (not shown) to the surface where it passes into a flow line 14. The downhole pump is actuated by reciprocal movement of a sucker rod string 15. Sucker rod string 15 is suspended in the well from a support unit 16 consisting of a sampson post 17 and a walking beam 18 which is pivotally mounted on the sampson post by a pin connection 19. The sucker rod string includes a polished rod section 15*a* which extends through a stuffing box (not shown) at the top of the tubing string and the section 15*b* formed of flexible cable. The cable section 15*b* is connected to the walking beam 18 by means of a "horsehead" 20.

The walking beam is reciprocated by a prime mover 21 such as an electric motor. The prime mover drives the walking beam through a drive system which includes drive belt 22, crank 23, crank shaft 24, crank arm 25, and a pitman 26 which is pivotally connected between the crank arm and walking beam by means of pin connections 27 and 28. The outer end of crank arm 25 is provided with a counterweight 29 which balances a portion of the load on the sucker rod string in order to provide for a fairly constant load on the prime mover.

The well pumping unit thus far described is conventional and merely exemplary of a specific embodiment which may be utilized in carrying out the present invention. For a more detailed description of other suitable beam pumping units which may also be utilized in carrying out the present invention, reference is made to PETROLEUM PRODUCTION ENGINEERING-OIL FIELD EXPLOITATION, 3rd Edition, McGraw-Hill Book Company, Inc., New York, Toronto, and London, 1953, Uren, L. C., and more particularly to the description of beam pumping units appearing in Chapter 6 thereof.

As the beam pumping unit is operated, the loading on the sucker rod string varies greatly. By analyzing this variance in sucker rod loading, a determination can be made as to the operating characteristics of the pumping unit. In accordance with the present invention, there is provided a system for monitoring the operation of a beam pumping unit by measuring load changes induced in the support unit as the sucker rod string is reciprocated. This is accomplished by locating on the support unit a load transducer which generates a signal representative of load changes induced in the support unit during operation of the pump. While the support unit loading may not be directly proportional to the sucker rod loading during pumping operations, the relationship between the two loads is predictable. For example, when the transducer is mounted on the top of the walking beam, as is preferred, the beam loading is directly proportional to the sucker rod loading when the beam is horizontal and departs from such direct relationship by a predictable function as the beam moves from the horizontal position during an upstroke or a downstroke.

Figure 2:
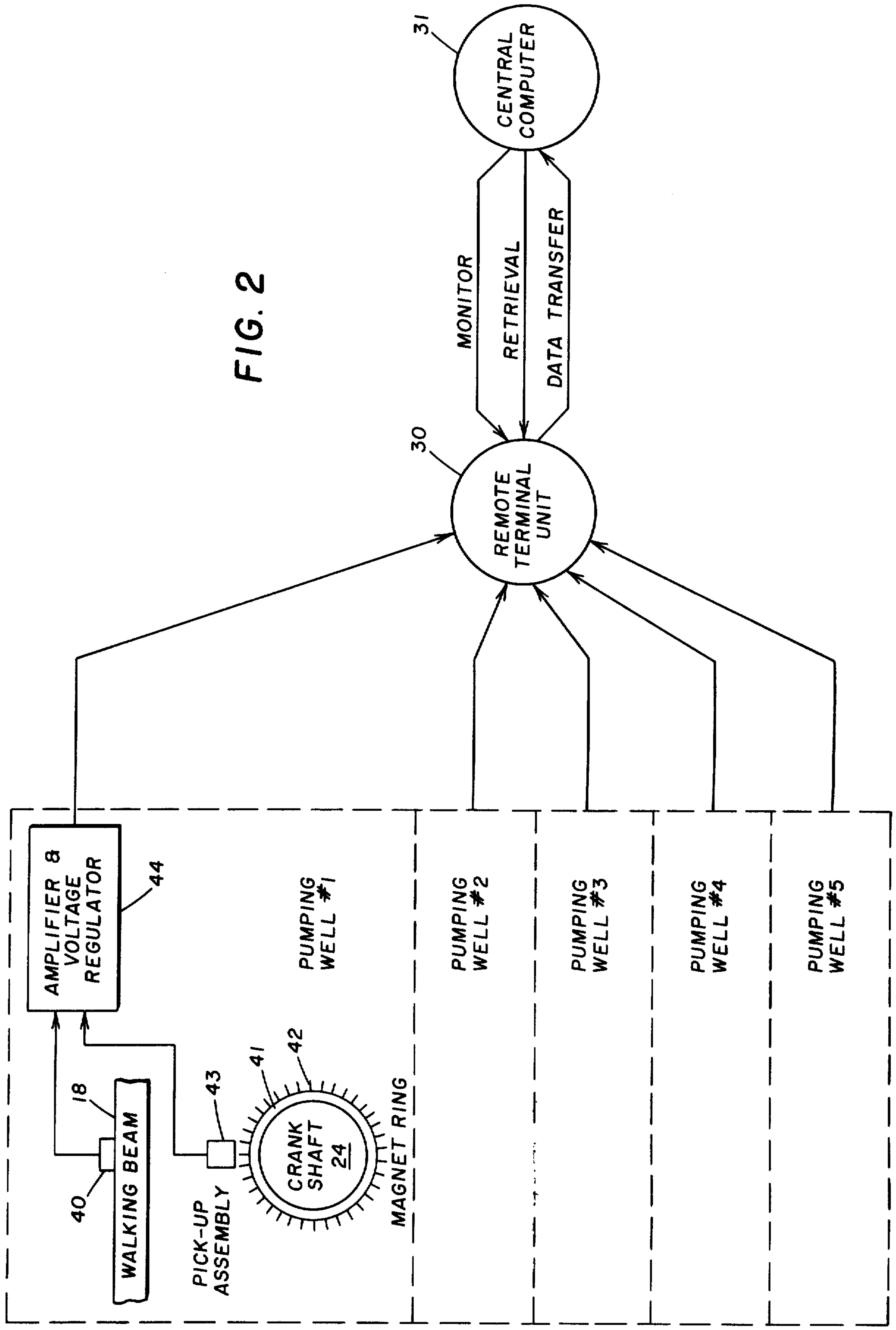
FIG. 2 illustrates a system for retrieving load data from a pumping well such as illustrated in FIG. 1.

Referring now to FIG. 2, there is shown a plurality of pumping wells which are coupled by means of a remote terminal unit 30 to a central computer 31. On each well there is installed a strain gauge 40, a magnet-carrying ring 41, a pickup assembly 43, and an amplifier and voltage regulator 44. Strain gauge 40 is mounted on walking beam 18 and provides an output current which is proportional to the load on the walking beam. This output current is applied to amplifier and voltage regulator 44. The strain gauge 40 may be of any suitable type adapted for positioning on the pumping unit or any component in which the load changes are representative of the load changes in the rod string. A particularly suitable transducer is disclosed in U.S. Pat. application Ser. No. 58,439, entitled WELL MONITORING APPARATUS, filed July 27, 1970, by Richard C. Montgomery and Jacque R. Stoltz. The magnet ring 41 is mounted around the crank shaft 24. The magnet-carrying ring contains a plurality of magnets 42 around the circumference of the ring. A particularly suitable magnet ring, for example, contains 36 magnets around the circumference of the ring at 10° intervals. The pickup assembly 43 provides a timing pulse every time a magnet is revolved past the pickup assembly. For example, with a magnet ring of 36 magnets, the pickup assembly provides a timing pulse for every 10° of rotation of the crank shaft 24. A particularly suitable pickup assembly contains two Hall-effect solid state switches. The voltage regulator portion of amplifier and voltage regulator 44 provides the proper voltage for the Hall-effect switches. In the specific embodiment disclosed herein the pumping well makes one pumping stroke for each revolution of the crank shaft 24. Therefore, 36 timing pulses are provided by the pickup assembly during each pumping stroke. It is these timing pulses from the pickup assembly 43 which are applied by the amplifier and voltage regulator 44 to the remote terminal unit 30.

One of the 36 magnets 42 on the magnet ring 41 is offset to provide a zero pulse. The zero pulse magnet may be installed at any one of the 36 positions to allow the beginning of the operation to occur at any point desired on the pump stroke.

Any number of pumping wells may be coupled to the remote terminal unit 30. For purposes of example herein, five pumping wells have been illustrated. System operation is initiated by a monitor command from computer 31. The monitor command energizes a relay in the remote terminal unit 30 so as to couple the pumping well to be monitored to the remote terminal unit. Starting at a zero point as determined by the zero pulse magnet, strain gauge readings are recorded in the remote terminal unit at 10° intervals around the complete stroke of the pumping unit. At each 10° point, the current output from the strain gauge 40 is converted to digital form and stored in the remote terminal unit, resulting in 36 words of digital data being recorded at 10° intervals around the pumping stroke. At any time after the strain gauge data for one complete pumping stroke has been recorded and stored in the remote terminal unit 30, the computer may address the remote terminal unit with a retrieval command and transfer the data from the remote terminal unit to the computer.

It can be particularly noted that the computer 31 is not tied up during the data recording cycle of each pumping stroke. After the computer issues the monitor command, it can continue with other activities until such time as the data from one complete pump stroke has been stored in the remote terminal unit 30. Then, at some later time, the computer can retrieve the data for analyzation or further storage.

Figure 3:
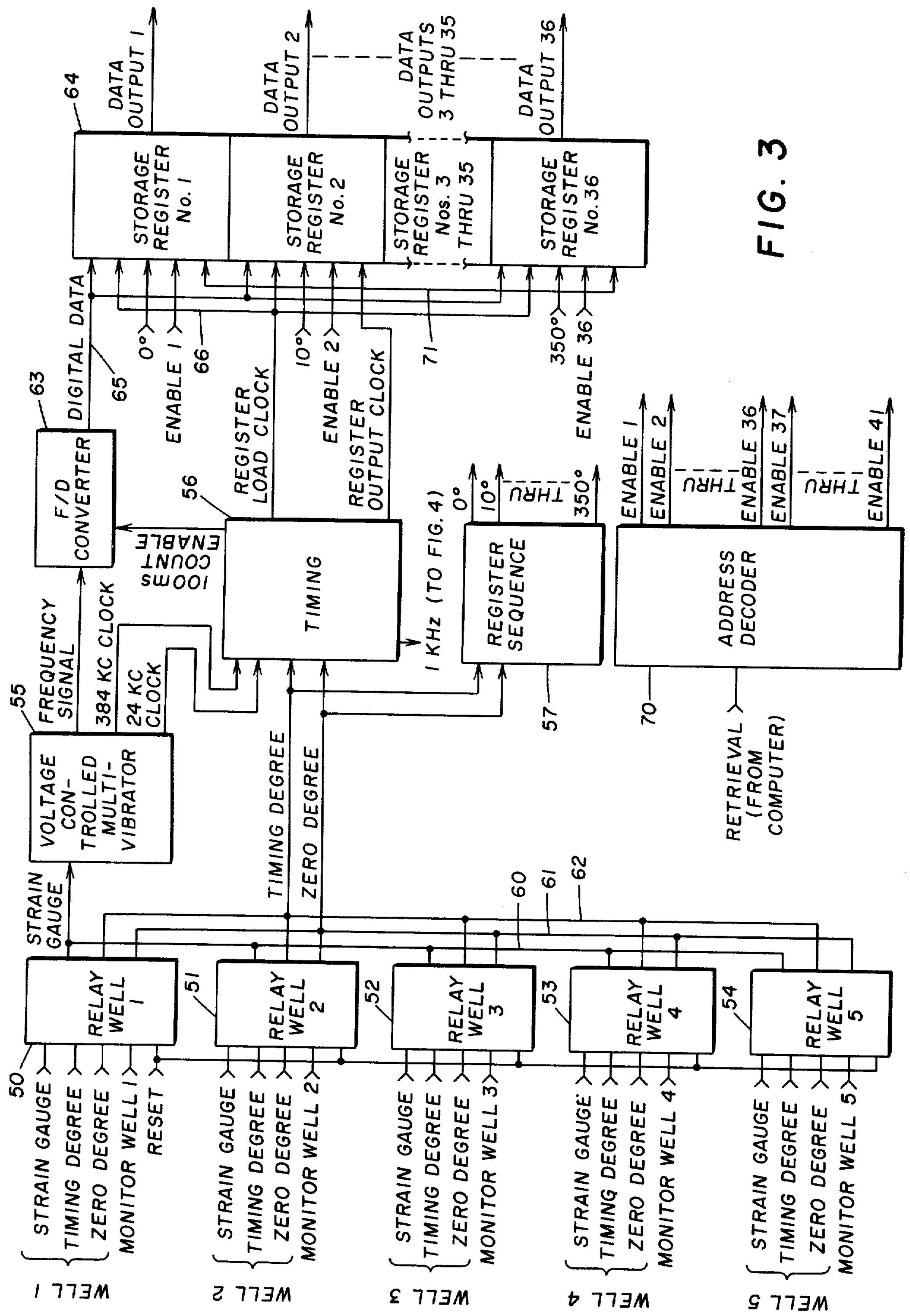
FIGS. 3 and 4 illustrate in block diagram a portion of the system of FIG. 2.

For further details of the operation of remote terminal unit 30, reference may now be made to FIG. 3. The outputs of the amplifier and voltage regulator 44 of each of the pumping wells 1–5 of FIG. 2 are connected respectively to the relays 50–54. Each of the pumping wells provides three signals. The strain gauge 40 provides a current signal as one input to each of the relays. The pickup assembly 43 at each of the pumping wells provides two signals. The first, a timing degree signal, is produced by the pickup assembly 43 for each 10° of revolution of the crank shaft 24. The second, a zero degree signal, is provided by the pickup assembly when the zero offset magnet passes the pickup assembly to initiate operation. Also applied to each of the relays 50–54 is a well address signal. This signal is a command directly from the central computer 31 and energizes the particular relay coupled to the pumping well for which the central computer desires to monitor and retrieve strain gauge data. For example, a monitor command from central computer 31 to monitor well No. 1 is coupled to relay 50. This command energizes relay 50 to couple the strain gauge signal to voltage controlled multivibrator 55 and to couple the timing degree and zero degree signals to the timing unit 56 and to the register sequence 57. The outputs of each of the relays 50–54 are tied together on common buses 60–62 so that data from the pumping well which is to be monitored is applied to voltage controlled multivibrator 55, timing unit 56, and register sequence 57. The frequency of the voltage controlled multivibrator 55 is controlled by the strain gauge current. This relationship is a linear function, with the frequency increasing as the current increases. Output of the voltage controlled multivibrator is coupled to an F/D converter 63 where the strain gauge data is converted to digital data for storage in a bank of storage registers 64.

Voltage controlled multivibrator 55 also provides a 24-KHz clock and a 384-KHz clock as inputs to timing unit 56. Timing unit 56 in response to its four input signals (zero degree, timing degree, 24-KHz clock, and 384-KHz clock) provides a 100-ms count enable signal for each 10° interval of crank shaft rotation. This 100-ms count enable signal synchronizes the strain gauge frequency sampling of the F/D converter and the storage of the digital data in the storage registers 64. That is, the strain gauge frequency signal is sampled for a 100-ms count period and converted to digital data for shifting into storage registers 64.

The register sequence 57 controls the shifting of the digital data from F/D converter 63 into the proper one of the 36 storage registers 64. As each of the timing degree signals is applied to the register sequence 57, an output is generated on one of the lines indicated by the legends "0°" through "350°." These 36 outputs are selectively coupled to the 36 storage registers 64. For example, the 0° output of register sequence 57 is coupled as a strobe input to storage register No. 1. The 10° output is connected as the strobe input signal to storage register No. 2, etc., until the 350° output signal is coupled as the strobe input to storage register No. 36. Such strobe signals enable the proper storage register to receive the digital data from the F/D converter by way of common bus 65. For example, the storage register No. 1 is enabled by the 0° strobe signal to receive and store digital data from F/D converter 63 at the end of the 100-ms sampling period following the zero timing degree pulse. The storage register No. 2 is enabled by the 10° strobe input signal to receive and store the digital data following the 100-ms sampling period immediately after the 10° timing pulse. This sequence of storage of digital data continues until storage register No. 36 receives and stores the digital data sampled during the 100-ms period after the 350° timing pulse. The digital data which is shifted into the 36 storage registers 64 is shifted into the respective registers in response to the register load clock from timing unit 56. The clock pulses are coupled to each of the 36 shift registers by means of common bus 66 and are generated by the timing unit 56 subsequent to the 100-ms sampling period and prior to the occurrence of the next 10° timing pulse. This relationship of the register load clock to the 100-ms count enable pulse and the timing degree pulse is illustrated in the timing chart of FIG. 5 and will be more fully described in connection with the detailed description of the timing unit 56 hereinafter.

To retrieve the data stored in the 36 storage registers 64, the computer sends a retrieval command to an address decoder 70. This retrieval command is an address code which is decoded in the address decoder 70 to provide 36 enable signals for the addressing of the 36 storage registers 64. As each of the storage registers is sequentially addressed, the data stored in the registers is sequentially shifted onto data output lines 1–36 leading to the computer. More particularly, as the address decoder 70 receives the address code for a particular storage register, it provides an enable signal to that register to enable the information stored in the register to be shifted out of the register onto the register's data output line. The data is shifted out of the storage registers in response to the register output clock from timing unit 56. This clock is connected to each of the storage registers 64 by way of common bus 71. For example, when the computer sends a retrieval command to the address decoder 70 for the addressing of storage register No. 1, address decoder 70 provides an enable 1 signal to the storage register No. 1. This enable 1 signal when applied to storage register No. 1 permits the register output clock to strobe the digital data out of storage register No. 1 onto data output line 1. Following the receipt of the data stored in storage register No. 1, the computer then initiates the address code for storage register No. 2. Upon decoding retrieval command for storage register No. 2, an enable 2 signal is applied to storage register No. 2 to enable the register output clock to strobe the digital data out of storage register No. 2 onto data output line 2. This sequence of addressing the storage registers and shifting the data stored in the registers onto the data output lines continues until all 36 storage registers have been addressed and the data applied to the computer by way of data outputs 1–36.

Figure 4:
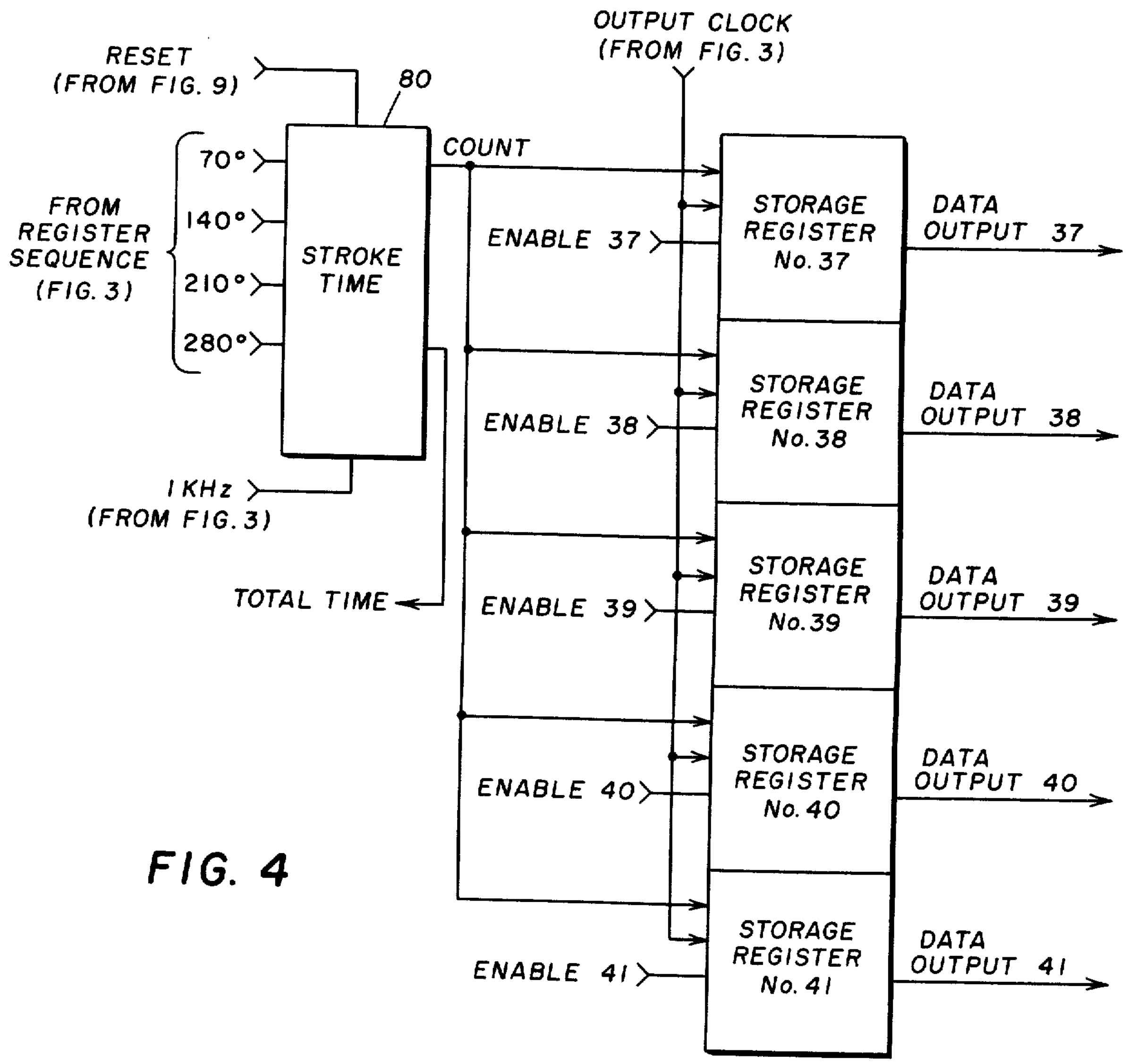

In addition to the monitoring and storing of the load characteristics on the beam pumping well, the remote terminal unit also records the stroke time of the pumping well in milliseconds from 0° to 70°, 0° to 140°, 0° to 210°, 0° to 280°, and 0° to 360°. This data is stored in five additional storage registers Nos. 37–41 as illustrated in FIG. 4. To determine the stroke time of the pumping well, a 1-KHz signal is generated by timing unit 56 (FIG. 3) and applied as one input to a stroke time unit 80. Also applied as inputs to stroke time unit 80 are the 70°, 140°, 210°, and 280° signals from the register sequence 57 of FIG. 3. The 1-KHz clock pulse is applied to a counter in the stroke time unit 80 which accumulates a count representative of the number of clock pulses applied. Upon the application of the 70° pulse to the input of stroke time unit 80, the count stored in the stroke time counter is shifted into storage register No. 37. Likewise, upon the occurrence of the 140°, 210°, and 280° signals, the count accumulated in the stroke time counter is shifted respectively into storage registers Nos. 38, 39, and 40. At the end of the 360° cycle, a reset pulse from timing unit 56 shifts the final count into storage register No. 41. Storage registers Nos. 37–41 thereby store a count representative of the stroke time in milliseconds for the intervals 0° to 70°, 0° to 140°, 0° to 210°, 0° to 280°, and 0° to 360°. The contents of storage registers Nos. 37–41 are strobed out as data outputs 37–41 to the computer. The data is strobed out by the output clock signal in similar fashion to the strobing of data out of storage registers Nos. 1–36 of FIG. 3. In addition to the enable signals 1–36 from address decoder 70 of FIG. 3, the additional enable signals 37–41 are generated when the address decoder 70 decodes the retrieval command for storage registers Nos. 37–41. Upon the application of an enable signal 37, for example, to storage register No. 37, the output clock from the timing unit 56 strobes the data in storage register No. 37 onto data output 37. Similarly, upon the application of enable signals 38–41 to storage registers Nos. 38–41, respectively, the output clock strobes the data from these registers onto data outputs 38–41.

Figure 5:
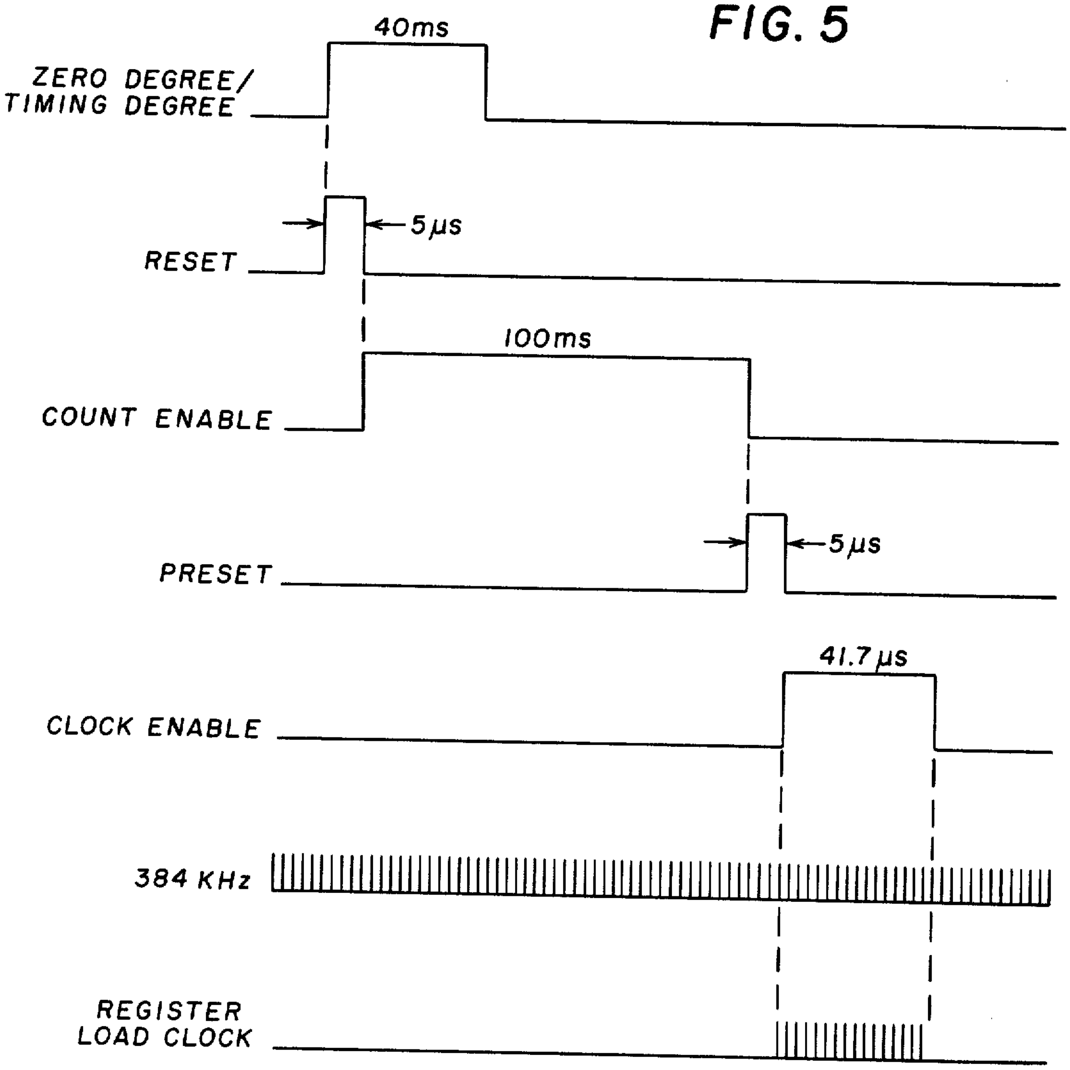
FIG. 5 illustrates, in time relationship, graphs of the various signals resulting from the operation of the system of FIGS. 2–4.

Having described the over-all system operation in relation to the block diagrams of FIGS. 2–4, a more complete understanding of the invention may be had by reference to the detailed circuit schematics of FIGS. 6–13 and to the timing graphs of FIG. 5.

FIG. 6: Relay

The relays 50–54 (FIG. 3) are used to connect each of the well sites to voltage controlled multivibrator 55. Each of these relays is identical in configuration and therefore only one relay is shown in detail in FIG. 6. The signals from each of the well sites, that is, strain gauge, timing degree, and zero degree, are applied as inputs to a relay 100. Also applied as input to relay 100 is the well monitor signal from the computer. The well monitor signal activates relay 100 to close the normally open contacts 101–105 and 110.

Figure 7:
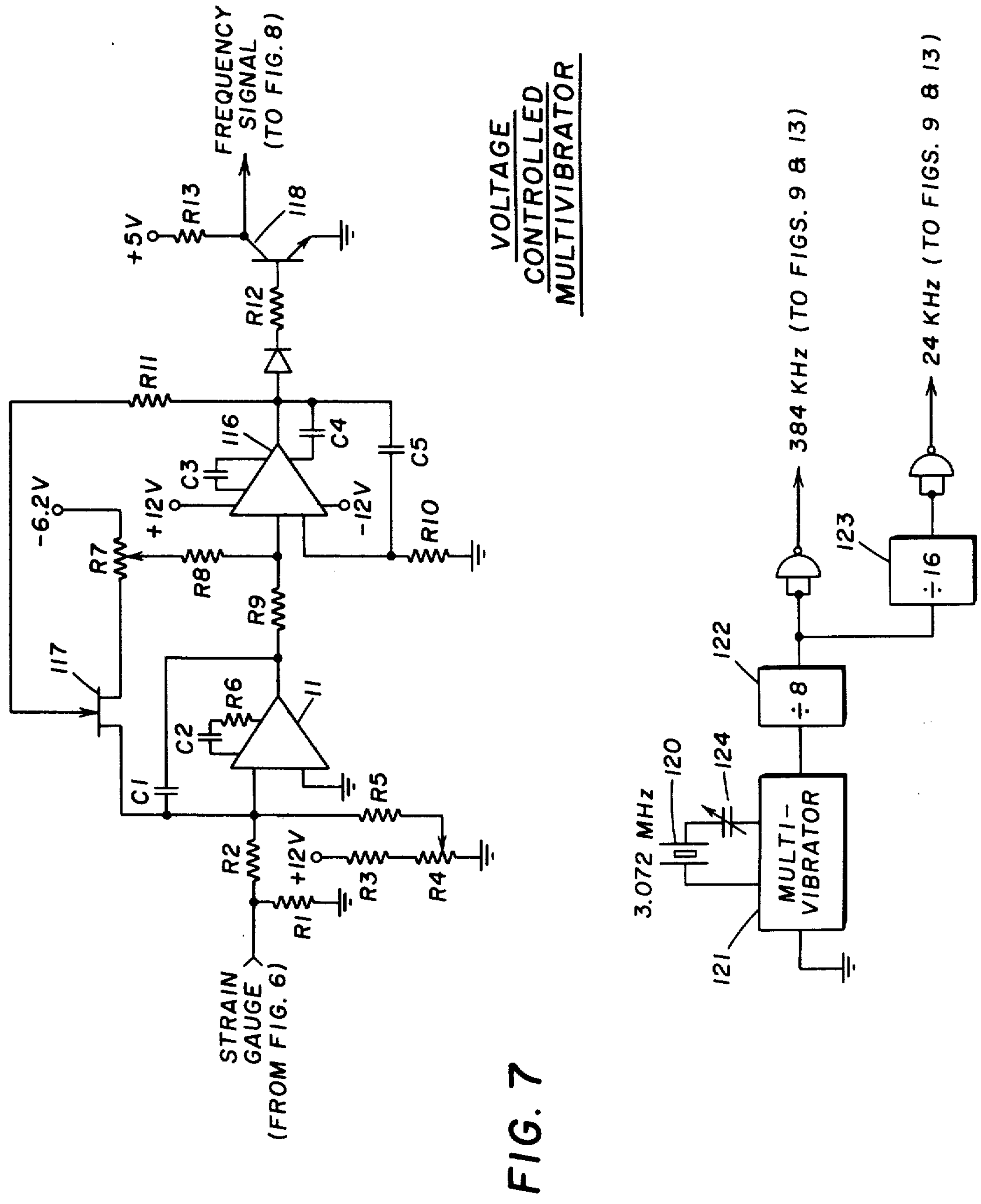

Contact 101 connects the strain gauge information to the voltage controlled multivibrator 55 (FIG. 7). Contacts 102 and 103 connect the timing degree and zero degree information to the timing unit 56 (FIG. 9) and to the register sequence 57 (FIG. 10).

Contacts 104 and 105 connect the 28-volt, d-c supply to relay 100 through the normally closed contact 107 of relay 106. Relay 100, after being energized, will remain energized until relay 106 is energized by the reset signal from the register sequence 57 (FIG. 10), indicating the end of monitoring operation. This reset signal energizes relay 106 and opens normally closed contact 107 to break the 28-volt supply line to relay 100, thereby deenergizing relay 100. The digital reset signal is converted into a suitable current level signal for application to relay 106 by means of resistor 108, transistor 109, and a 5-volt, d-c supply.

Contact 110 connects the 5-volt, d-c supply to pulse generator 111 which provides the initial reset signal for resetting the shift registers in the register sequence (FIG. 10) each time the relay 100 is energized by the well monitor signal.

FIG. 7: Voltage Controlled Multivibrator

Figure 6:
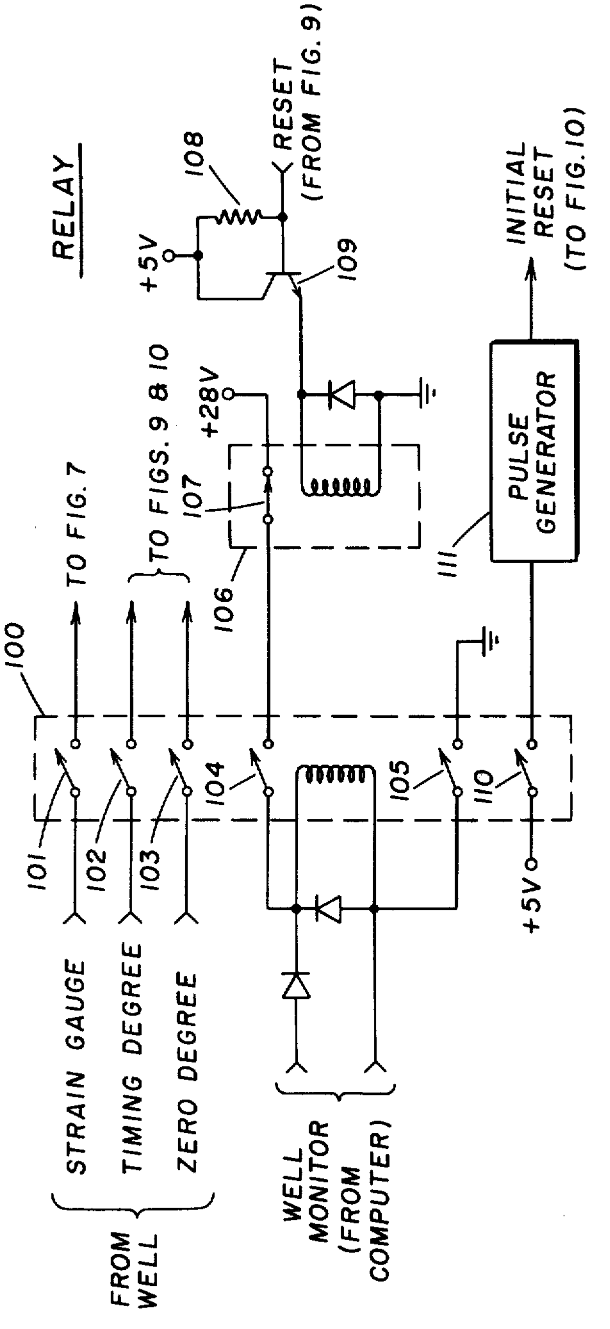
FIGS. 6–13 are circuit schematics of various portions of the units illustrated in FIGS. 3 and 4.

The frequency of the voltage controlled multivibrator 55 is controlled by the strain gauge current signal from the relay unit (FIG. 6). This relationship is a linear function, with the frequency signal output of the voltage controlled multivibrator 55 increasing as the strain gauge current input increases. This conversion of the strain gauge current signal to a frequency-dependent signal occurs through the operation of operational amplifiers 115 and 116, transistors 117 and 118, and the associated bias components, resistors $R_1$–$R_{13}$ and capacitors $C_1$–$C_5$.

The voltage controlled multivibrator 55 also provides the basic clock timing for the system in the form of a 24-KHz clock and a 384-KHz clock. The basic timing is derived from the 3.072-megahertz crystal 120 and the multivibrator 121. The output of multivibrator 121 is divided to 384 KHz by the divider 122 which is a divide-by-8 circuit. The 384-KHz signal is then divided to a 24-KHz signal by the divide-by-16 circuit 123. Further control for the 3.072-megahertz crystal and multivibrator 121 is provided by means of variable capacitor 124.

Figure 8:
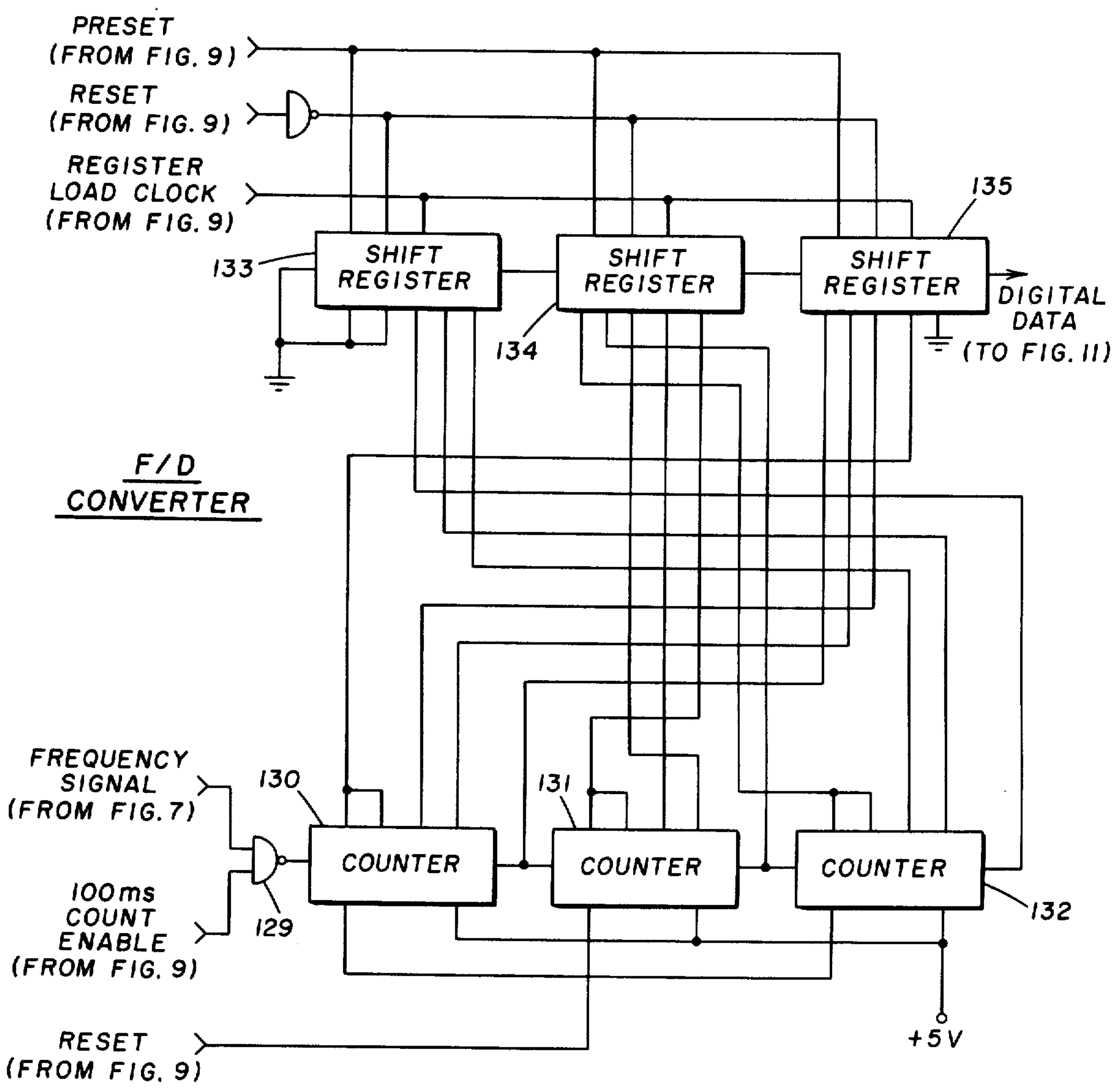

FIG. 8: F/D Converter

The variable-frequency output signal from the voltage controlled multivibrator 55 is applied to the F/D converter 63 which is more fully illustrated in FIG. 8. The variable-frequency signal is applied to one input of a gate 129. A 100-millisecond count enable signal from the timing unit 56 (FIG. 9) is applied to a second input of gate 129. This 100-millisecond signal enables gate 129 and allows the frequency signal to pass into binary counters 130, 131, and 132. At the end of the 100-millisecond count period, a preset pulse from the timing unit 56 (FIG. 9) is applied to each of shift registers 133, 134, and 135. The application of this preset pulse enables the loading of shift registers 133, 134, and 135 with the count stored in the counters 130, 131, and 132. The digital data is then strobed out of the shift registers at the 384-KHz clock rate as provided by the register load clock signal from timing unit 56. After the digital data is shifted out of the shift registers, both the shift registers 133–135 and the counters 130–132 are reset by means of a reset pulse from the timing unit 56. The F/D converter is now ready for the next count period which will be initiated upon the application of the next 100-millisecond count enable signal to gate 129.

Figure 9:
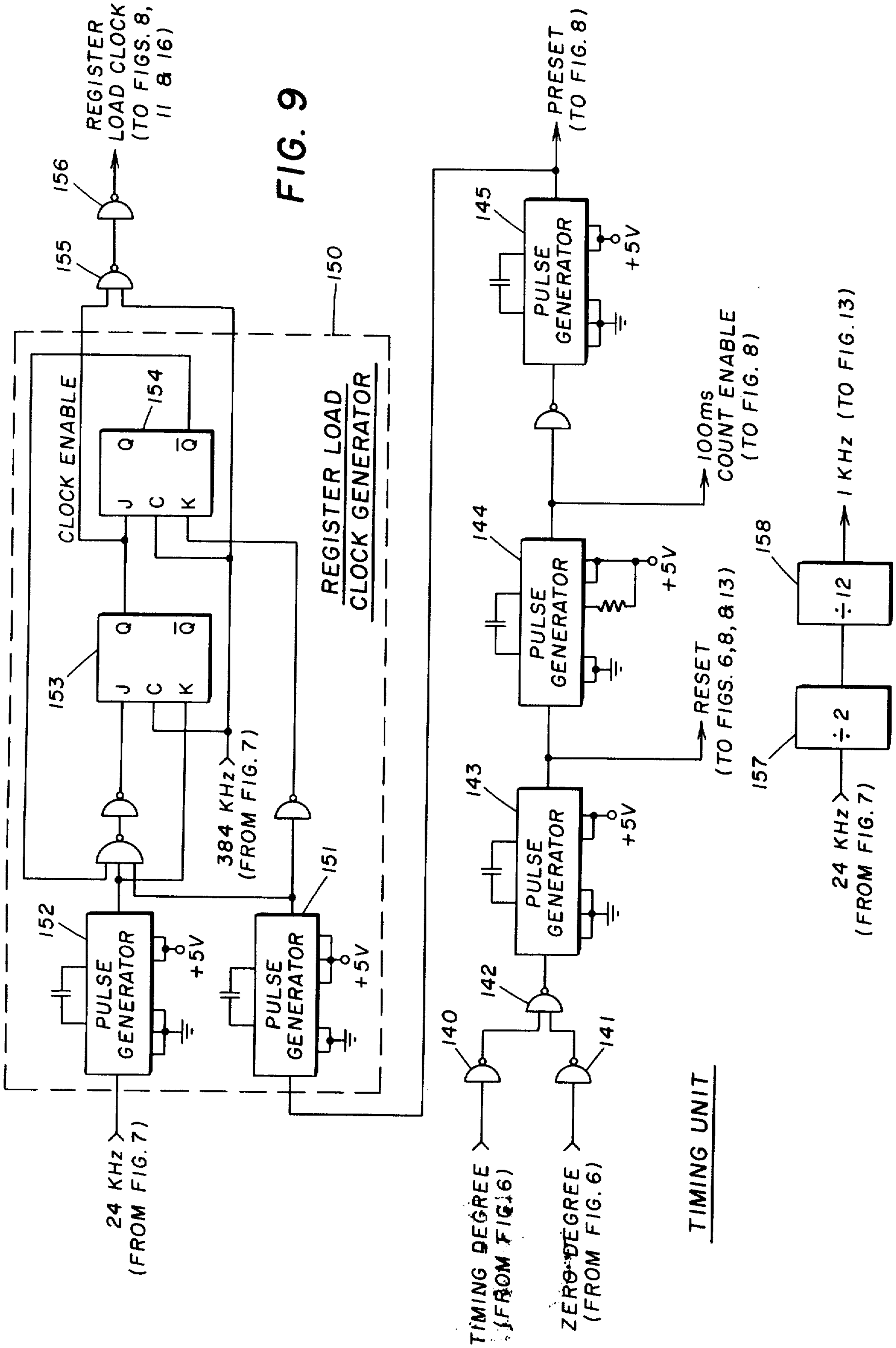
Figure 10:
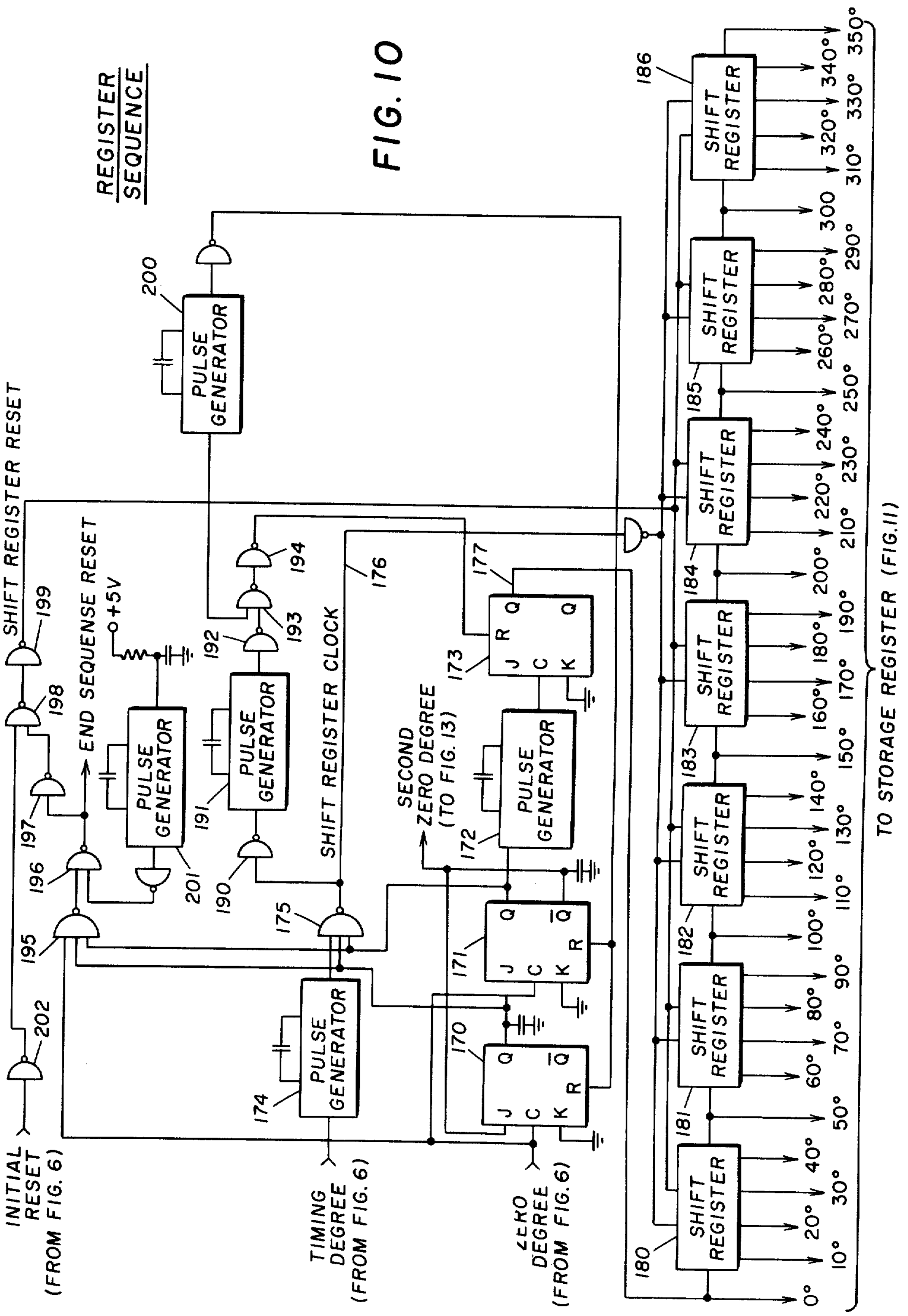

FIG. 9: Timing Unit

The timing unit 56 provides the clock pulses necessary for synchronizing the loading of the digital data from the F/D converter 63 into the storage registers 64.

Referring now to FIG. 9, in conjunction with the timing diagram of FIG. 5, the timing degree and zero degree signals from the relay unit (FIG. 6) are applied as inputs to gates 140 and 141, respectively. Upon the presence of either a timing degree signal or a zero degree signal, gate 142 enables pulse generator 143 to produce a 5-microsecond reset pulse which is used to reset the binary counters 130–132 and the shift registers 133–135 of the F/D converter 63. On the positive-to-negative transition of the reset pulse, the pulse generator 144 produces a 100-millisecond count enable pulse which is applied to the F/D converter 63. At the end of the 100-millisecond count enable pulse, the pulse generator 145 produces a 5-microsecond preset pulse which is applied to the F/D converter 63 to preset the shift registers 133–135. The preset pulse is also coupled as one input to a register load clock generator 150. This reset pulse is applied to a pulse generator 151. A second pulse generator 152 is coupled at its input by the 24-KHz clock from the voltage controlled multivibrator 55. The 384-KHz clock from the voltage controlled multivibrator 55 is coupled to the clock inputs of a pair of JK flip-flops 153 and 154 and is also coupled as one input to a gate 155. Upon the application of the 5-microsecond preset pulse to pulse generator 151, the generator 150 produces a 41.7 -microsecond clock enable pulse at one input to the gate 155. This 41.7-microsecond pulse enables gate 155 and gate 156 to provide a register load clock comprising sixteen 384-KHz clock pulses to storage register 64. These sixteen 384-KHz clock pulses strobe the digital data from the F/D converter 63 into the storage register 64.

Figure 13:
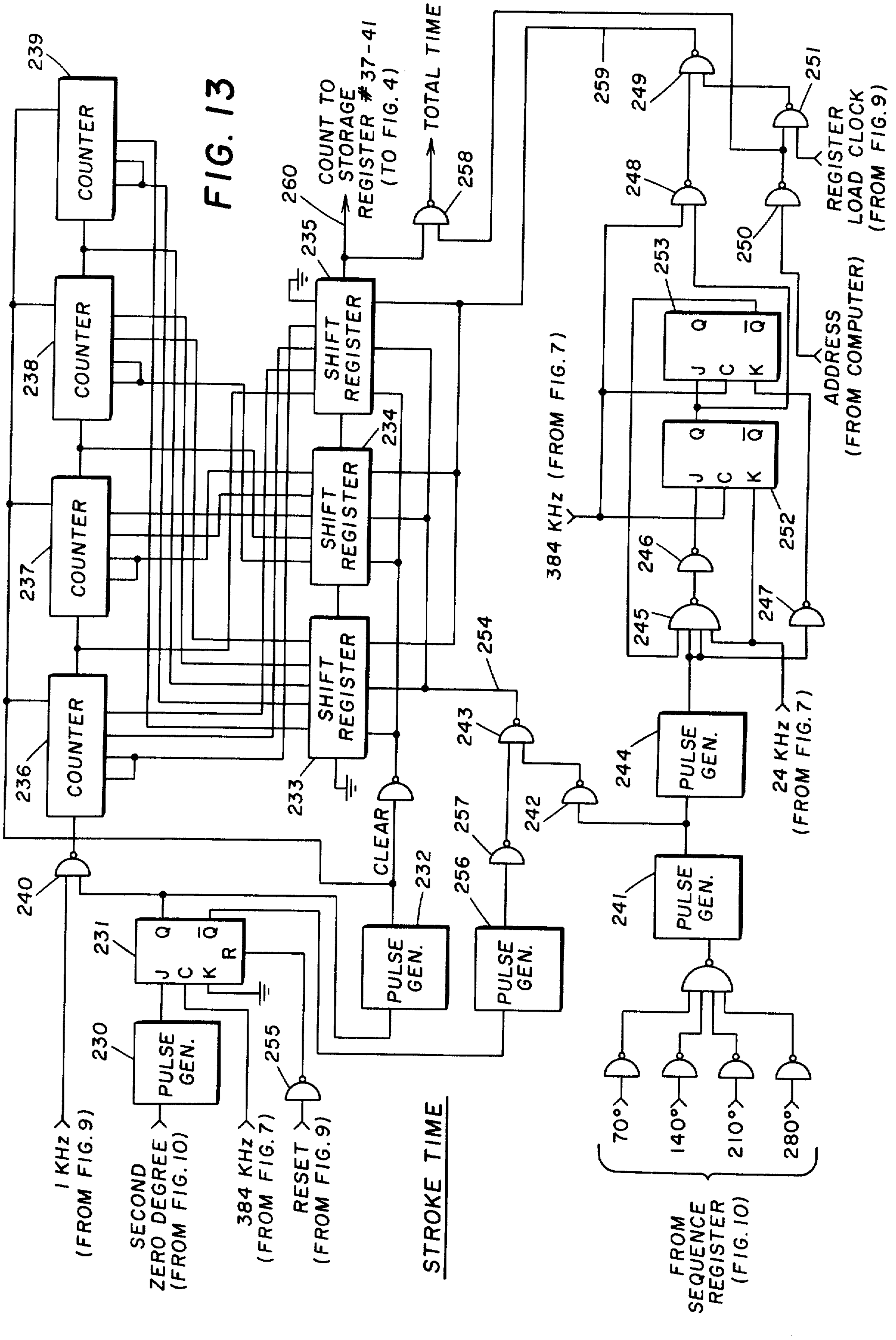

Also included within the timing unit 56 are a pair of counters 157 and 158. Counter 157 is a divide-by-2 counter and counter 158 is a divide-by-12 counter. The 24-KHz clock from the voltage controlled multivibrator 55 is applied as one input to counter 157 and is counted down to a 1-KHz signal at the output of counter 158 for use in the stroke time unit 80 (FIG. 13).

FIG. 10: Register Sequence

The register sequence 57 is utilized to enable the proper storage register to receive digital data from the F/D converter 63. After the addressing of one of the relays by a monitor signal from the computer, the initial zero degree signal received by the register sequence 57 from the addressed relay sets flip-flop 170. When flip-flop 170 is set, the Q output enables the J input of flip-flop 171 so that the next zero degree signal will set flip-flop 171. The setting of flip-flop 171 energizes pulse generator 172 which sets flip-flop 173 to provide a logic "1" bit on line 177. This enables the 0° output line to the storage register 64. The timing degree signal is applied as an input to pulse generator 174. The output of pulse generator 174 is applied as one input to a gate 175. The Q outputs of flip-flops 170 and 171 enable gate 175 to permit the output of pulse generator 174 to be applied by way of line 176 as a shift register clock to each of a plurality of shift registers 180–186. As the first 10° timing pulse is received, the logic "1" bit on line 177 at the input to shift register 180 is shifted to the right one position by the shift register clock, thereby enabling the 10° output line from shift register 180. Similarly, each successive 10° timing degree signal shifts the logic "1" bit one further position to the right in shift registers 180–186 to sequentially enable the 20°–350° output lines.

The shift register clock is also coupled by way of gate 190 to pulse generator 191. Pulse generator 191 provides a reset pulse by way of gates 192, 193, and 194 to the reset terminal of flip-flop 173. This reset pulse to gate 173 is delayed in time from the shift register clock pulse by the inherent delay through gate 190, pulse generator 191, and gates 192–194, thereby allowing the logic "1" bit at the input to shift register 180 to be shifted into the shift register 180 before the resetting of flip-flop 173. This sequence of shifting the logic "1" bit one position to the right in each of the shift registers 180–186 upon the application of a timing degree signal to the pulse generator 174 continues through all the 36 10° positions, thereby providing the 0°–350° output signals from the shift registers 180–186 for strobing the digital data into the storage register 64. When the next zero degree pulse is received, gates 195 and 196 are enabled to provide the end sequence reset signal. Upon enabling of gates 195 and 196, gates 197, 198, and 199 are also enabled to provide a shift register reset to each of the shift registers 180–186. This reset signal is also applied to pulse generator 200 which, in turn, generates the reset signal for flip-flops 170 and 171. A pulse generator 201 enables gates 196, 197, 198, and 199 to reset shift registers 180–186 when power is first applied to the system or when a power failure occurs. An initial reset pulse from the relay (FIG. 6) is applied through gate 202 each time a relay is energized by a monitor signal from the computer. This initial reset signal passes through gates 202, 198, and 199 to likewise reset shift registers 180–186 and energize pulse generator 200 to reset flip-flops 170 and 171.

Figure 11:
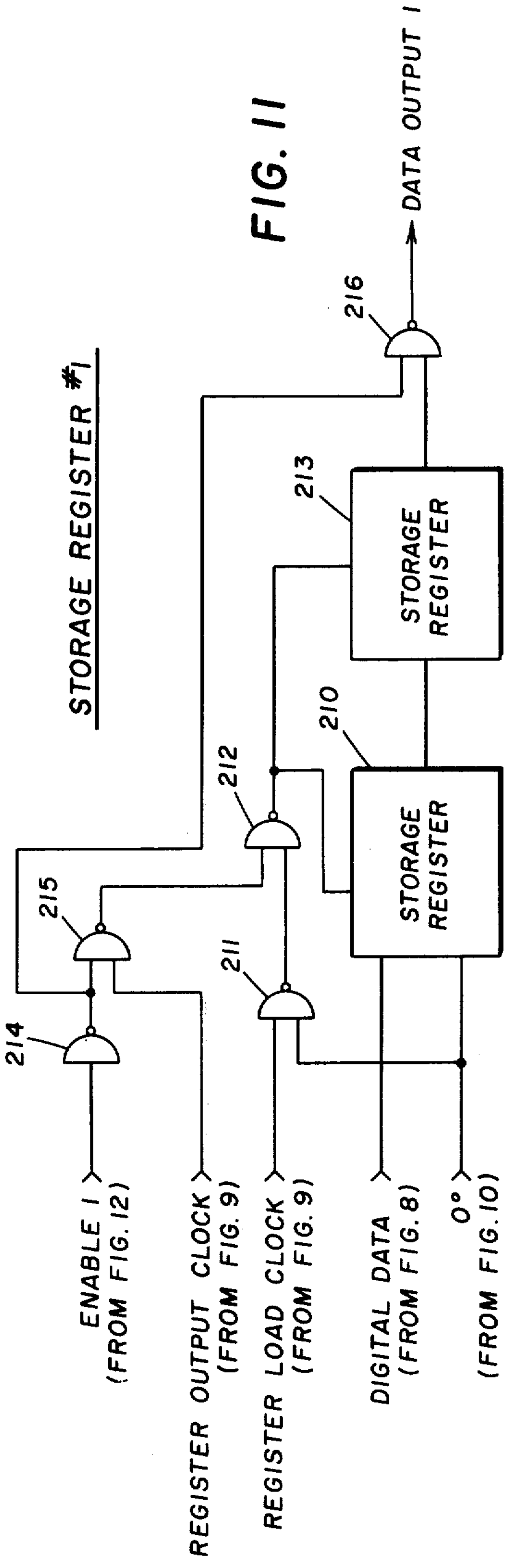

FIG. 11: Storage Register

The storage register receives digital data from the F/D converter by way of line 65 and retains it in the proper storage register until addressed by the computer during data retrieval. Each of the 36 storage registers is identical in configuration, and the digital data input line 65 (FIG. 3) is common to each of these registers. FIG. 11 illustrates one such storage register, storage register No. 1. The digital data is applied to one input of storage register 210. The 0° output line from register sequence 57 (FIG. 10) is connected to a second input of storage register 210 and also to one input of a gate 211. A logic "1" bit on the 0° output line of the register sequence enables gate 211 to pass the register load clock through gate 212 to the storage register 210. The logic "1" bit also enables the storage register 210 to permit the digital data to be strobed into the storage register 210 in response to the register load clock. The register load clock is also applied by gate 212 to a second storage register 213. Upon the filling of storage register 210, the digital data is shifted into storage register 213 at the register load clock rate.

To retrieve the data, the proper address of the storage register No. 1 is decoded in the address decoder 70 (FIG. 12) and an enable 1 signal applied to gate 214. Gate 214 enables gate 215 to pass the register output clock to each of the storage registers 210 and 213 by way of gate 212. Gate 214 also enables gate 216 to permit data stored in the registers 210 and 213 to be strobed out onto the data output 1 line in response to the register output clock.

Figure 12:
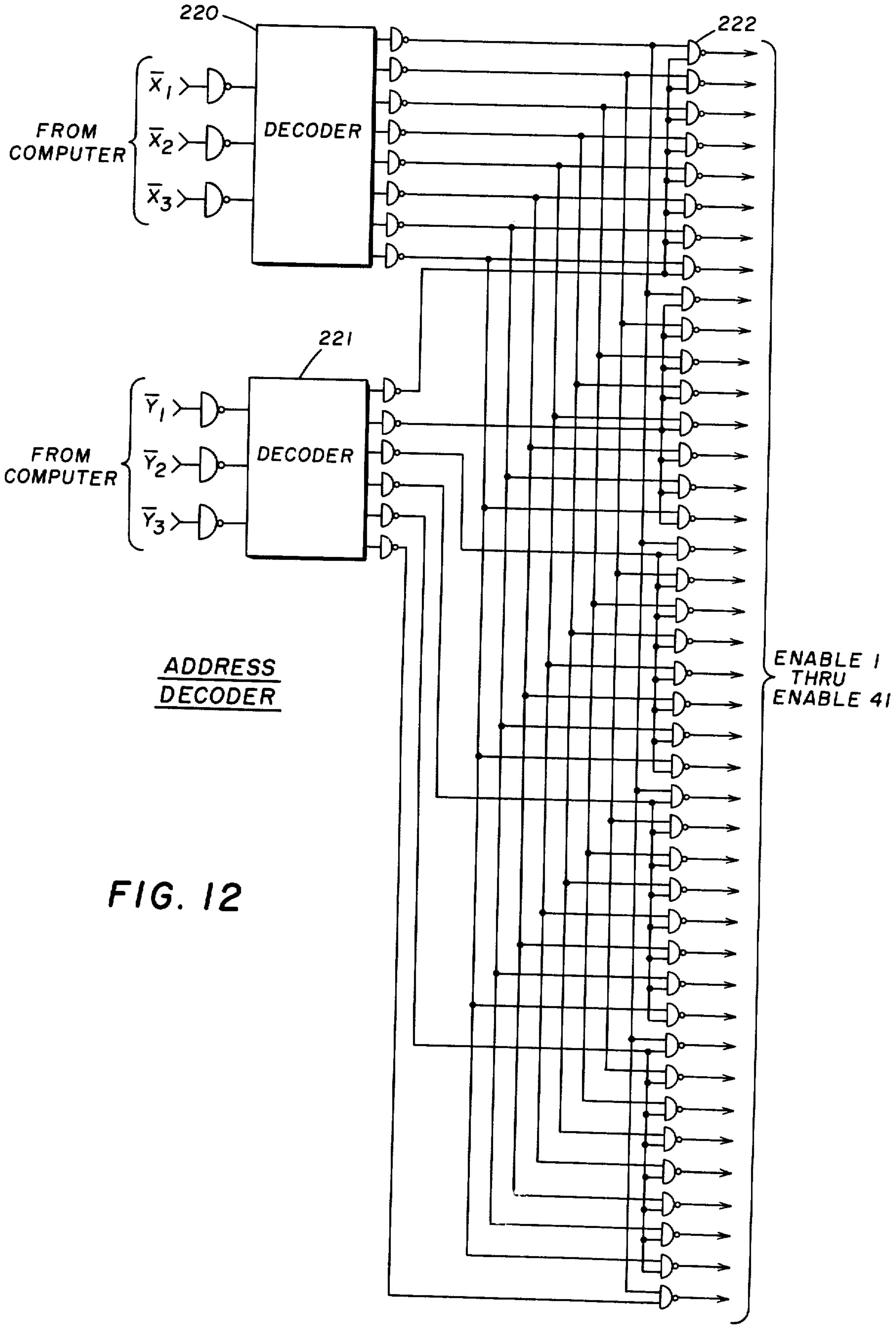

FIG. 12: Address Decoder

The proper storage register addressing commands are generated by address decoder 70. The computer sends the address code in the form of signals $X_1$, $X_2$, and $X_3$ and $Y_1$, $Y_2$, and $Y_3$. The $X_1$, $X_2$, and $X_3$ signals are applied to a binary to 1-of-8 line decoder 220, while the $Y_1$, $Y_2$, and $Y_3$ signals are applied to a second binary to 1-of-8 line decoder 221. Outputs of each of the decoders 220 and 221 are combined to provide an enable 1 output signal from gate 222 when the proper address code for storage register No. 1 is sent by the computer to the decoder units 220 and 221. Similarly, enable 2 - enable 41 signals are provided on the respective output lines from address decoder 70 upon the addressing of decoders 220 and 221 with the proper codes for storage registers No. 2 – No. 41.

FIG. 13: Stroke Time

The stroke time unit 80 provides the total time of the pumping stroke in milliseconds. As flip-flop 171 on the register sequence unit (FIG. 10) is set, a second zero degree signal is applied from flip-flop 171 to pulse generator 230 in the stroke time unit. Pulse generator 230 thereby enables flip-flop 231 so that the next 384-KHz clock pulse will set the flip-flop 231. As flip-flop 231 is set, the pulse generator 232 produces a clear pulse for shift registers 233–235 and for counters 236–239. The setting of flip-flop 231 also enables gate 240 to allow the 1-KHz pulses from the timing unit to be gated into and counted by the binary counters 236–239. As the 70°, 140°, 210°, and 280° pulses are sequentially received from the register sequence 57 (FIG. 10), the pulse generator 241 produces a pulse on line 254 by way of gates 242 and 243 to parallel load the shift registers 233–235 with the binary count present in the counters 236–239 at the time of occurrence of the 70°, 140°, 210°, and 280° pulses. At the termination of the pulse from pulse generator 241, pulse generator 244 produces a pulse, enabling a clock generator, comprised of gates 245–249 and flip-flops 252 and 253, to produce a clock pulse on line 259 to shift the stroke count from shift registers 233–235 into the proper storage registers 37–41 by way of the count output line 260. At the end of the 360° cycle of the pumping stroke, a reset pulse from the timing unit 56 is applied through gate 255 to reset flip-flop 231. This resetting of flip-flop 231 inhibits gate 240 from passing the 1-KHz signal to the counters 236–239. In response to this resetting of flip-flop 231, pulse generator 256 generates a pulse on line 254 by way of gates 257 and 243 to parallel load the final 360° count in the counters 236–239 into the shift registers 233–235. This final 360° count remains in the shift registers until the computer addresses the shift registers through gate 250. At that time, the final 360° count is strobed out of the shift registers through gate 258 as the total time output signal.

Various types and values of circuit components may be utilized in the networks of FIGS. 5–13 to effect the previously described operation. The following TABLE I sets forth one specific example of components which are suitable for such use.

TABLE I

| | | |
|---|---|---|
| All gates, flip-flops, counters, pulse generators, and shift registers | 7400 series logic | (Texas Instruments) |
| Operation amplifiers 115 and 116 | 709 | (do.) |
| Transistor 109 | T1S98 | (do.) |
| Transistor 117 | 2N4857 | (do.) |
| Transistor 118 | 2N2925 | (do.) |
| Multivibrator 121 | MC 4024 | (Motorola) |
| Decoders 220 and 221 | MC 4006 | (do.) |
| Resistor 108 | 1 kohm | |
| Resistor $R_1$ | 250 ohms | |
| Resistor $R_2$ | 20 kohms | |
| Resistor $R_3$ | 1.2 kohms | |
| Resistor $R_4$ | 200 ohms | |
| Resistor $R_5$ | 4.3 kohms | |
| Resistor $R_6$ | 1.5 kohms | |
| Resistor $R_7$ | 1 kohm | |
| Resistors $R_8$, $R_9$, $R_{10}$, $R_{11}$, and $R_{12}$ | 10 kohms | |
| Resistor $R_{13}$ | 500 ohms | |
| Capacitor $C_1$ | 0.1 μF | |
| Capacitors $C_2$ and $C_5$ | 330 pf | |
| Capacitor $C_3$ | 100 pf | |
| Capacitor $C_4$ | 40 pf | |
| Capacitor 124 | 25 pf | |

The foregoing components of Texas Instruments are more fully identified and described in THE INTEGRATED CIRCUITS CATALOG FOR DESIGN ENGINEERS, First Edition, published by Texas Instruments Incorporated, P.O. Box 5012, Dallas, Tex., and the components of Motorola are more fully identified and described in THE MICROELECTRONICS DATA BOOK, Second Edition, December 1969, published by Motorola Semiconductor Products, Inc., P.O. Box 20912, Phoenix, Ariz.

Various modifications to the disclosed embodiment, as well as alternate embodiments, may become apparent to one skilled in the art without departing from the scope and spirit of the invention as hereinafter defined by the appended claims.

We claim:

1. A well monitoring system for measuring operating conditions at a plurality of pumping wells of the type having a crank shaft and a sucker rod string and means to reciprocate the sucker rod string to operate a downhole pump as the crank shaft revolves, comprising:

a. at least two transducers connected to each of said pumping wells, a first transducer generating a load signal representative of the changing load conditions on the sucker rod string during pumping and a second transducer generating a timing pulse at least once during each pumping stroke of the sucker rod string representative of the rate of rotation of said crank shaft, b. a central computer for generating a plurality of monitor commands, each monitor command identifying a selected one of said pumping wells, and a retrieval command, and c. a remote terminal unit coupled to said transducers and to said central computer, comprising:

1. a frequency-to-digital converter,
2. a digital storage unit connected to the output of said frequency-to-digital converter,
3. means responsive to each of said monitor commands for selectively connecting the first transducer at the pumping well identified by a monitor command to said frequency-to-digital converter and the second transducer at the same pumping well to said digital storage unit, whereby the load signal from the selected pumping well is converted to a digital signal by the frequency-to-digital converter and whereby the timing signal from the selected pumping well enables the digital storage unit to store the digital signal from the frequency-to-digital converter at a data rate dependent upon the rate of rotation of the crank shaft of the selected pumping well, and
4. means responsive to said retrieval command from the computer for enabling the digital signals to be clocked out of the digital storage unit into said computer at a data rate that is independent of the rates of rotation of the crank shafts of the pumping wells.

2. The system of claim 1 wherein said storage unit includes a plurality of storage registers, said load signals after being converted to digital signals by the frequency-to-digital converter being strobed into said storage registers at the data rate determined by the frequency at which said timing signals are produced at the pumping wells.

3. The system of claim 2 wherein said retrieval command is a plurality of sequential address codes, each code identifying a particular one of said storage registers and wherein said storage unit further includes a decoder which decodes each address code and enables the particular storage register identified by that address code to transfer its digital contents to said computer, whereby the computer receives digital signals representing the load conditions at said pumping wells at a data rate determined by the frequency at which said computer issues said address codes.

4. The system of claim 1 wherein said means for selectively connecting said first transducer at a pumping well to said frequency-to-digital converter and said second transducer at the same pumping well to said digital storage unit includes a plurality of relays equal in number to said plurality of pumping wells, each relay being energized by a monitor command identifying the pumping well to which said relay is connected.

5. The system of claim 4 wherein each of said monitor commands is a binary signal in which one of its two states energizes the relay to which it is coupled.

6. A method of measuring operating conditions at a plurality of pumping wells of the type having a crank shaft and a sucker rod string and means to reciprocate the sucker rod string to operate a downhole pump as the crank shaft revolves, comprising the steps of:

a. generating a load signal representative of the changing load conditions on the sucker rod string of each well during pumping, b. generating a timing pulse at least once during each pumping stroke of the sucker rod string of each well representative of the rate of rotation of the crank shaft, c. generating a plurality of monitor commands, each monitor command identifying a selected one of said pumping wells, d. converting the load signal from the pumping well identified by the monitor command to a digital signal, and e. storing said digital signal in a digital storage unit at the data rate of said timing pulses from the identified pumping well.

7. The method of claim 6 further including the steps of:

a. generating a retrieval command, b. generating clock pulses, and c. transferring said digital signals out of said storage unit in response to said retrieval command, said transfer being at the data rate of said clock pulses.

* * * * *